United States Patent [19]
Bushue et al.

[11] Patent Number: 5,539,805
[45] Date of Patent: Jul. 23, 1996

[54] POWER SUPPLY SYSTEM INCLUDING RINGING VOLTAGE RESET UNDER LOW INPUT VOLTAGE CONDITIONS

[75] Inventors: Mike Bushue, Belmont; Steve Cartier, San Jose; Craig A. Lindahl, Mountain View; David Hurst, San Ramon, all of Calif.

[73] Assignee: Raynet Corporation, Menlo Park, Calif.

[21] Appl. No.: 310,245

[22] Filed: Sep. 21, 1994

[51] Int. Cl.$^6$ .............................. H04M 1/24; H04M 1/00; H04M 9/60; H04M 9/08

[52] U.S. Cl. .............................. 379/361; 379/1; 379/412; 379/413

[58] Field of Search .............................. 379/1, 2, 22, 26, 379/34, 412, 413, 412, 399; 363/8, 127, 163, 71

[56] References Cited

U.S. PATENT DOCUMENTS

| | | | |
|---|---|---|---|
| 4,718,079 | 1/1988 | Resito | 379/2 |
| 5,247,583 | 9/1993 | Reichelt | 379/418 X |
| 5,260,996 | 11/1993 | Dillon et al. | 379/418 |
| 5,321,596 | 6/1994 | Hurst | 363/8 |

Primary Examiner—Stephen Chin
Assistant Examiner—Paul Loomis
Attorney, Agent, or Firm—Lyon & Lyon

[57] ABSTRACT

A voltage detection circuit, in conjunction with a power supply system for ringing voltage generation in a remote telecommunications unit, monitors the operating voltage level of the remote unit and, when an undervoltage condition is detected, causes a ringing reference-signal generator to collapse the reference (AC) sine wave into a fixed (DC) state and holds it in this state for a preselected time, thereby substantially reducing the ringing-signal current load and allowing the operating voltage level to restore. The features of the invention allow for continued processing of calls in progress and for incoming call completion during an undervoltage condition. The increased reliability and integrity of the power supply system allows for extended power supply feeder distance to the remote telecommunications unit.

19 Claims, 5 Drawing Sheets

POWER SUPPLY SYSTEM INCLUDING RINGING VOLTAGE RESET UNDER LOW INPUT VOLTAGE CONDITIONS

BACKGROUND OF THE INVENTION

1. Field of the Invention

This invention concerns the field of power supply systems for telecommunications applications and, in particular, to power supply systems for generating ringing voltage signals in remotely located telecommunications units.

2. Prior Art Systems and Methods

In a conventional telephone network, a wire pair extends from a "central office" location to a subscriber's premises. Battery voltage is typically applied to the wire pair at the central office to power the subscriber's telephone service set(s), and an AC voltage, traditionally a nominal 90 volts at 20 Hertz, is applied to "ring" the service set(s) at the subscriber's premise, in order to signal an incoming call and induce the subscriber to remove the handset from its cradle, creating an "off hook" condition. The standard telephone service set within the traditional U.S. telephone system includes an audible call annunciator, classically a bell, more recently a piezoelectric resonator, which is broadly resonant at a given "ringing frequency," broadly in a range of 16 to 67 hertz, wherein, for example, 20 hertz is a typical ringing frequency used in the U.S. and 25 hertz is a typical ringing frequency used in Europe.

Ringing voltage is generated at a central office in a number of ways. For example, a rotary generator, or ringing machine, may be employed consisting of a single-speed motor, either AC or DC, depending upon the local power supply. The motor rotates one or more AC generators which generate the desired ringing frequencies and voltages. Magnetic generators operating from AC power mains at the central office have also been used to generate ringing signals. Such generators employ resistors, transformers and tuned circuits of inductors and capacitors in order to develop the desired ringing signal. Vibrating reed converters have also been employed to generate ringing voltage from a 48 volt (DC) central office battery supply. These converters typically include two magnetic coils, an armature and a reed assembly mounted on a frame, and convert the 48 volts DC into an AC square wave of the desired frequency for ringing. A device such as a mechanical interrupter is typically employed to divide the ringing generator's signal into alternating ringing and silent periods, the traditional U.S. standard being alternating periods of two seconds "ringing" and four seconds "silent" For example, one implementation has been a motor for rotating a shaft carrying a number of cams which operate switch contacts that switch the ringing signal on and off. All of the foregoing approaches are generally bulky, however, and require significant amounts of primary operating power.

Fiber optic networks are proliferating within U.S. and foreign telecommunications networks, wherein communication signals are sent via lightwave signal transmission over an optical medium, typically an "optical fiber", instead of via electrical signal transmission over a metallic medium, typically a wire pair. Known fiber optic telecommunications distribution networks typically comprise a plurality of optical fibers extending from a central office location to a remotely located subscriber interface unit (SIU), wherein each optical fiber comprises a communications path for one or more subscribers served from the SIU. At the SIU, the optical signals are converted to electrical signals and then transmitted the remaining distance to each subscriber over a traditional wire pair. Because centralized signal transmission for several subscribers over an optical fiber is often more cost effective than individual signal transmission over a wire pair, it is desirable to be able to locate each SIU as close as possible to the subscribers it serves.

It is not possible, however, to send central office battery power and ringing voltage signals via optical transmission. Thus, operating power and ringing signal generation must be provided locally at each SIU and delivered to subscribers in an appearance functionally identical to the existing "wire plant" network discussed above. For example, U.S. Pat. No. 5,321,596, entitled "DC/DC/AC Power Supply For A Subscriber Interface Unit" issued to D. Hurst and assigned to the assignee of the present application, discloses an efficient and compact power supply system for generating on-demand ringing voltage signals in an SIU. The Hurst system includes a DC to DC switched mode power supply, which converts a source of DC primary power into DC operating power for an SIU. A ringing voltage signal is derived by converting a reference sine wave into an AC voltage signal derived from a DC to AC power converter. In one described embodiment, the ringing voltage signal is a 56 volts-RMS sine wave centered at −48 volts. The ringing voltage signal is centered at −48 volts in order to provide sufficient "offset" voltage from ground, which normally requires an offset of at least −40 volts, so that the SIU can detect an off-hook condition on a particular subscriber line receiving the ringing signal.

Most functions of an SIU that consume operating power, (e.g., optical/electrical signal conversion, off-hook monitoring, call processing, etc.), require a substantially constant operating power level, $P_{SIU}=V_{SIU}*I_{SIU}$, where $V_{SIU}$ represents available operating voltage supplied to the SIU, and $I_{SIU}$ represents the operating current load of the SIU. If the SIU operating power level falls below a minimum threshold for any non-negligible duration of time, (e.g., for more than 10 ms), the SIU will cease operation until the available operating power level recovers, thereby causing undesirable service interruptions and call failures. Because the required operating power is constant, a drop in the operating voltage level will cause the SIU to attempt to pull additional current in order to maintain minimum threshold power. There are limits, however, to the SIU's ability to increase current in order to maintain minimum operational power because of the corresponding additional drain on the operating voltage supply.

In particular, as demonstrated in FIG. 1, when the SIU current load is less than the current load at maximum power, the relationship between the operating voltage level $V_{SIU}$ and current load $I_{SIU}$ is linear and stable. However, when the current load exceeds the current load at maximum power $P_{MAX}$, the operating voltage becomes unstable and can drop precipitously. Thus, for stable operation of an SIU, a certain, minimum voltage supply, $V_{MIN}$, must be maintained in order to prevent the total operating power from dropping below the required threshold.

Operating voltage for an SIU is typically supplied over a "feeder" line from a voltage source. In some instances, the voltage source is local to the SIU. In many cases, however, the feeder line extends over a substantial distance, thereby significantly reducing the available voltage supply at the SIU location because of the resistance of the feeder line ($R_{FEEDER}$ in FIG. 1). Because the SIU voltage supply is directly related to the feeder line resistance R, feeder line distances must often be kept shorter than is otherwise desirable, (e.g., no longer than where $R = R_{MAX}$ in FIG. 1), and can represent a limiting restraint on the distance an SIU can be located from a central office. Further, SIU operating cost constraints typically require that power supplied to an SIU be limited to that actually necessary to meet applicable service levels—i.e., sufficient to ensure that call completion and call processing functions are fully operational under most all, non-extraordinary, operating conditions.

Voltage used for ringing signals imposes a relatively significant transient load on the operating power of an SIU, e.g., typically up to 4 watts per line. In particular, simultaneous ringing of two or more lines can cause a severe impact on the operating voltage supply of an SIU, even if the overlap is only momentary. For illustrative purposes, FIG. 2 depicts the incremental impact of three subscriber lines, A, B, and C, respectively, on the current load and corresponding operating voltage of an SIU, where subscriber lines A, B and C each require simultaneous ringing signal generation. In particular, during each interval $T_{IMAX}$, where all three subscriber lines require ringing voltage generation, the operating voltage level falls below $V_{MIN}$, creating an "undervoltage" condition.

Built into traditional telecommunications industry service level criteria is the likelihood of a very small percentage of subscriber lines in an SIU requiring simultaneous ringing voltage generation during a particular time interval. However, the relatively large corresponding operating voltage supply required to ensure that sufficient stand-by power is available for accommodating simultaneous on-demand ringing signal generation for more than a very small percentage of subscriber lines would impose a prohibitively high operating cost. As a result, the operating voltage supply of an SIU, $V_{SIU}$, is susceptible to low, or "undervoltage" conditions, if simultaneous ringing voltage is required for more than a small percentage of subscriber lines, i.e., if the number of subscriber lines simultaneously requiring ringing voltage exceeds the capability of the power supply. Other factors, such as, for example, fluctuating input voltage levels and/or feeder line resistance may further cause the operating voltage supply of an SIU to be particularly susceptible to an undervoltage condition, even when only a small number of subscribers require simultaneous ringing voltage generation.

Thus, it is desirable to provide a power supply system for generating on-demand ringing voltage signals in an SIU, or the like, wherein corrective steps are taken during a low voltage condition to limit power consumed by ringing voltage generation, in order to ensure that sufficient continuous operating power is delivered to the SIU and uninterrupted service maintained, without imposing significant stand-by power supply costs.

SUMMARY OF THE INVENTION

According to the present invention, a voltage detection circuit is provided in conjunction with a power supply system for generating ringing voltage signals in an SIU, or other remote telecommunications unit. The detection circuit monitors the available operating voltage level of the SIU and, if an "undervoltage" condition is detected, causes a ringing reference signal to temporarily change state from an AC sine wave to a steady-state DC voltage. The reference signal is used to shape a voltage output signal generated by a DC to AC power conversion operation for supplying on-demand ringing voltage signals. Under "normal" SIU operating voltage conditions, i.e., where there is sufficient operating voltage available for providing threshold operating power to the SIU, the converted voltage is shaped by the AC sine wave reference signal into a AC sine wave of appropriate frequency and voltage to provide standard ringing functionality, centered at a sufficiently negative offset voltage to detect an off-hook condition, preferably −48 volts. When an undervoltage condition is detected in the SIU, i.e., where there is not sufficient voltage available to operate the SIU without risking failure, the converted voltage is shaped by the reference steady-state DC reference signal into a steady-state DC voltage, which, while unable to provide ringing functionality, is sufficiently offset so that an off-hook condition can still be detected by the SIU. Because the steady-state DC voltage imposes a significantly lower transient current load on the SIU operation than does the AC sine wave ringing voltage signal, the voltage supply of the SIU is allowed to restore to a safe operating level.

Upon initial detection of an undervoltage condition in an SIU, the DC voltage reference signal is employed in lieu of the AC sine wave for a predetermined time interval, preferably at least 20 ms and no more than 100 ms, to allow proper restoration of the SIU operating voltage level, while minimizing audible ringing signal loss to subscribers. If, at the end of the predetermined time interval, an undervoltage condition is still detected, then the DC voltage reference signal is maintained for an additional time interval, with the process repeated until the SIU voltage level is restored to a sufficient operating level, or until ringing signal generation is no longer required.

Thus, it is an object of the invention to provide a power supply system for generating on-demand ringing signals in a remote telecommunications subscriber interface unit, wherein transient ringing voltage is eliminated during low operating voltage conditions to ensure continuous operating power is available to the SIU and uninterrupted service is maintained. One advantage of the invention includes the ability to extend the power supply feeder distance from a voltage supply source to an SIU.

As will be apparent to those skilled in the art, other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate both the design and utility of preferred embodiments of the present invention, in which.

DETAILED DESCRIPTION OF THE PREFERRED EMBODIMENTS

Figure 1:
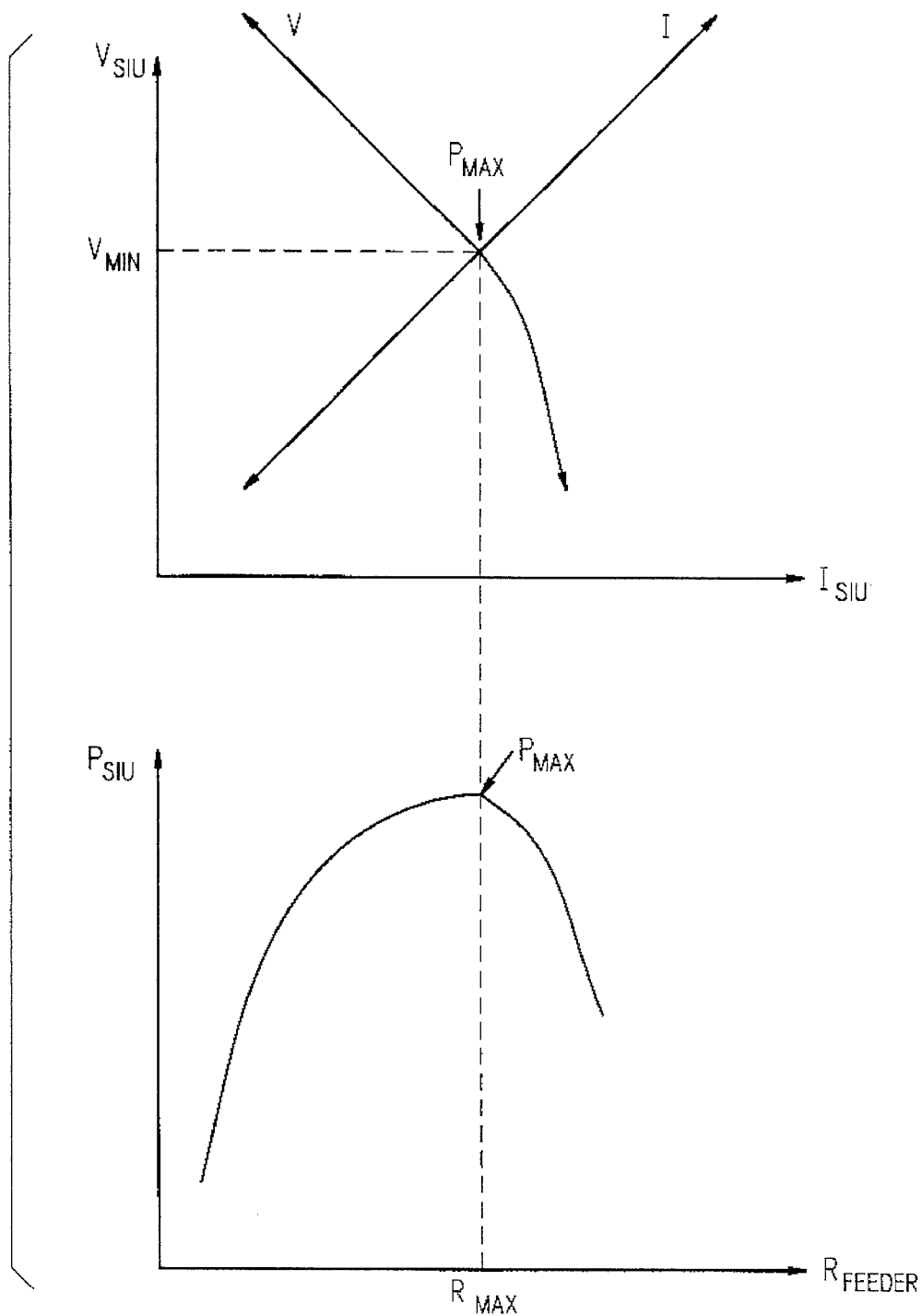
FIG. 1 depicts exemplary power curves for a typical SIU operation.
Figure 2:
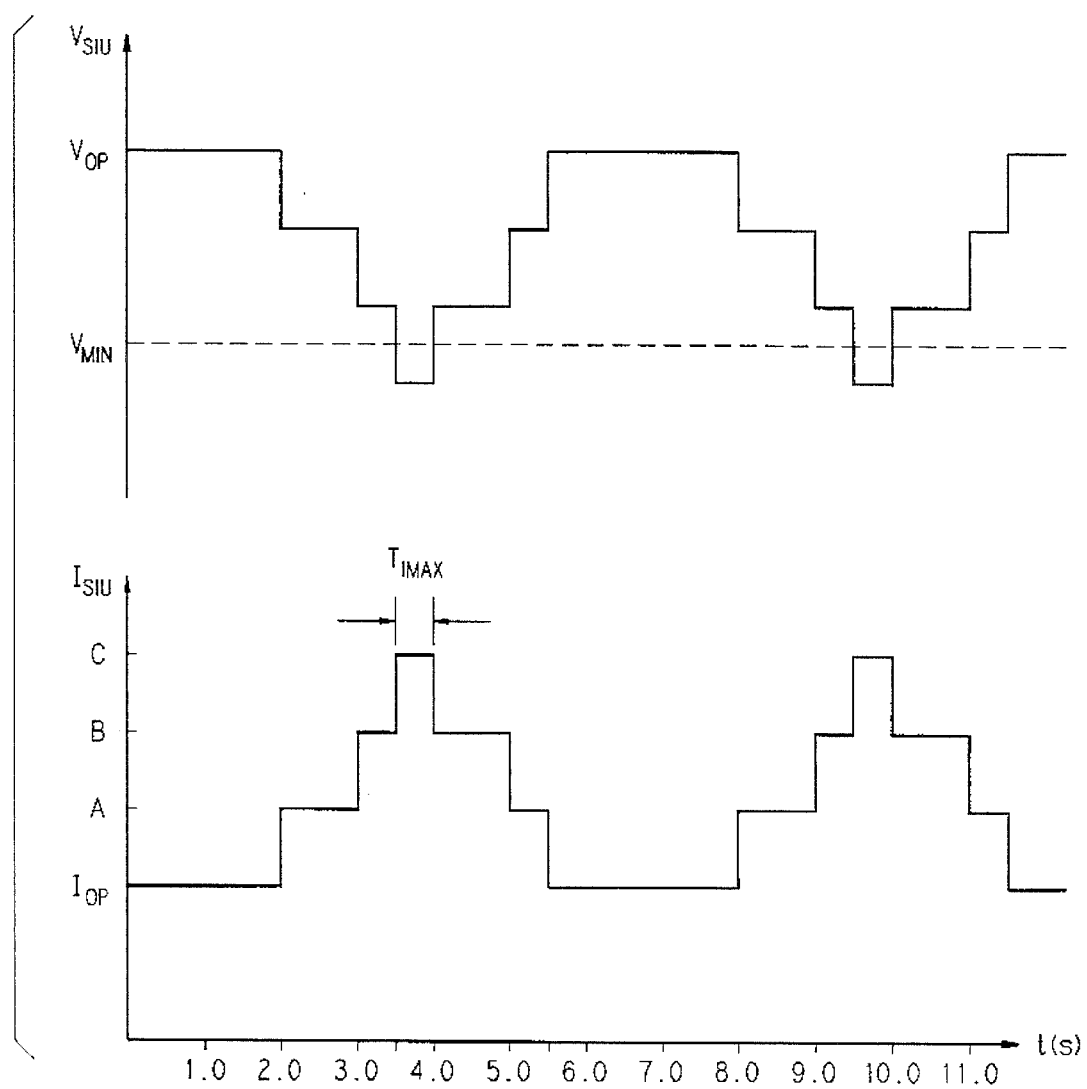
FIG. 2 depicts the impact on available operating voltage in a typical SIU operation when ringing voltage is simultaneously required for a plurality of subscriber lines.
Figure 3:
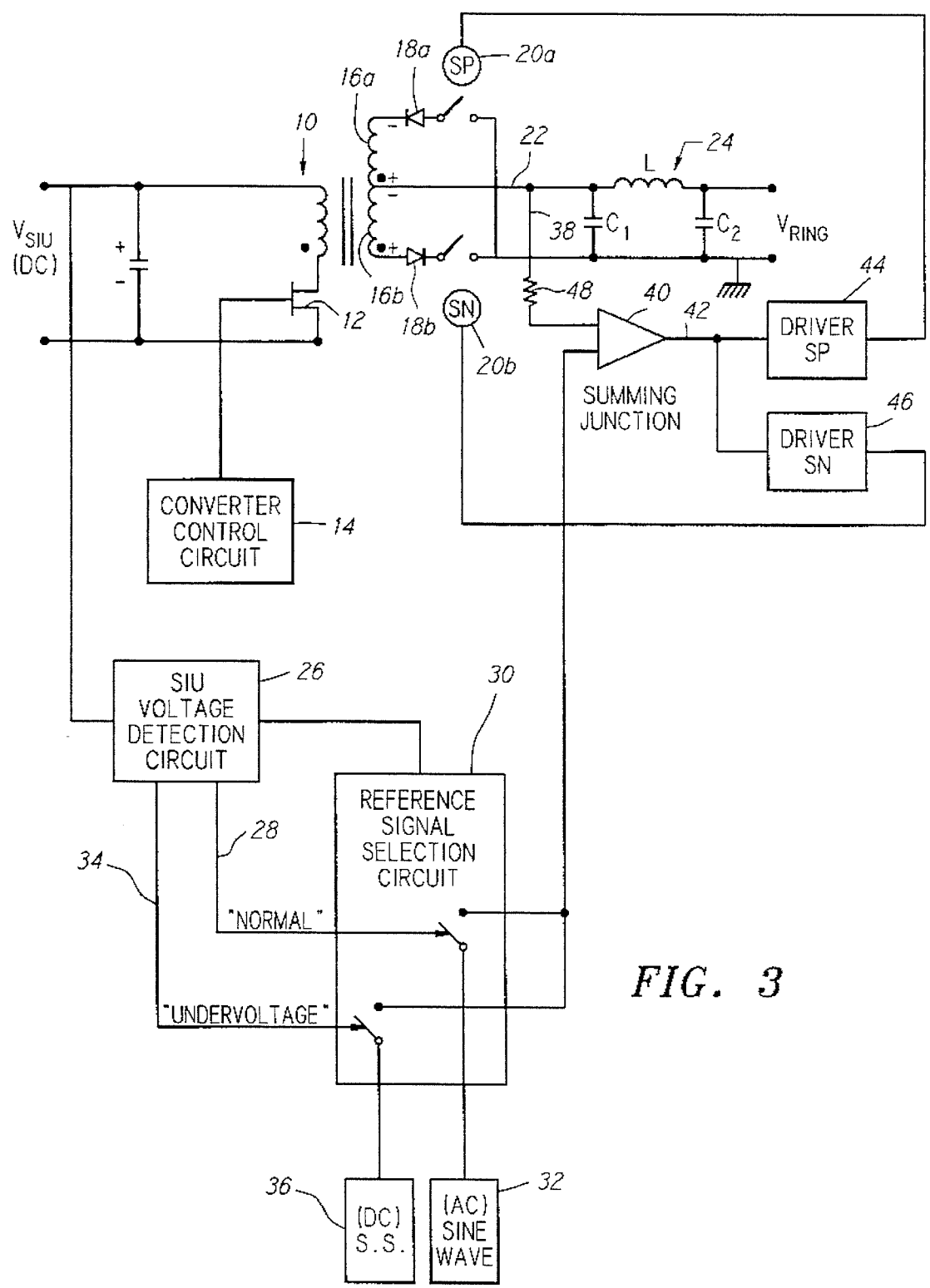
FIG. 3 is a schematic diagram of a preferred embodiment of the present invention.

FIG. 3 illustrates a power supply system for generating ringing voltage signals in a remote telecommunications subscriber interface unit (SIU). The system comprises a flyback power converter 10, for converting a DC voltage supply $V_{SIU}$ into AC ringing voltage $V_{RING}$. The converter 10 includes a primary side transistor switch 12, such as a field-effect-transistor switch (FET) or the like, operated by a converter control circuit 14, which periodically causes current to be transferred through a pair of secondary transformer windings, 16a and 16b, respectively, wherein winding 16a circulates current through a first, "positive" rectifying diode 18a, and winding 16b circulates current through a second, "negative" rectifying diode 18b, respectively. A pair of switches 20a and 20b build a ringing voltage signal 22 from positive and negative current supplied through rectifying diodes 18a and 18b, respectively. Ringing voltage signal 22 is smoothed through an LC filter circuit 24 and provided as ringing voltage VRmNG for on-demand use in subscriber line(s) served by the SIU. In preferred embodiments, additional ringing voltage signals may be generated for use by substantially similar converter circuit operations (not shown) provided in parallel with converter 10.

A voltage detection circuit 26 monitors the SIU operating voltage level $V_{SIU}$ at the primary side input to power converter 10. Under "normal" SIU operating voltage conditions, i.e., where $V_{SIU}$ is equal to or greater than a predetermined minimum required operating voltage level $V_{MIN}$, a first, low voltage control signal 28 is output by the detection circuit 26 into a reference signal selection circuit 30, wherein control signal 28 triggers the reference signal selection circuit 30 to output a low voltage (AC) reference sine wave 32. Sine wave 30 is preferably transmitted within a range of 16 to 67 hertz, with the actual frequency selected according to the desired ringing frequency for the SIU subscriber lines. When an "undervoltage" condition is detected, e.g., where $V_{SIU}$ is less than $V_{MIN}$, a second, low voltage control signal 34 is output by voltage detection circuit 26 into the reference signal selection circuit 30, triggering circuit 30 to output a steady-state, low (DC) voltage signal 36, in lieu of (AC) reference sine wave 32.

Various known circuit design and switching techniques may be employed to achieve the aforementioned reference signal generation and selection of either an (AC) sine wave signal 32 or a steady-state low (DC) voltage signal 36, depending on the voltage level $V_{SIU}$ detected at the input to the ringing signal power converter 10. By way of example(s), a low voltage (AC) reference sine wave may be generated by imputing a high frequency AC sine wave reference, (e.g., 200 hertz or greater), into a step counter, such as a Johnson step counter, and then converting the counter output signal into a smooth, low frequency sine wave via a filter circuit. A steady-state, low (DC) voltage signal may be provided by a reference voltage source, preferably no more than 2.5 volts and substantially accurate. An operational-amplifier type feedback hysteresis may be employed in conjunction with one or more transistor switches to select between the (AC) sine wave and (DC) steady-state voltage, based on a selected voltage level differential between control signals 28 and 34. Other known circuit switching techniques may also be employed to achieve the change in ringing reference signals based on the detected voltage level of the SIU operating voltage.

An electrical path 38 is provided between the output side of the power converter 10 and a summing junction 40, wherein ringing voltage signal 22 is input into summing junction 40 via path 38. Reference signal 32 or 36 is also input into summing junction 40, wherein summing junction 40 compares reference signal 32 or 36 with ringing signal 22. A feedback signal 42 is output from summing junction 40 and input into positive and negative switch drivers 44 and 46, respectively, which drive positive current switch 20a and negative current switch 20b, respectively, in order to shape ringing voltage signal 22 into the same form as the particular reference signal 32 or 36. Preferably, a resistor 48 is provided across electrical path 38 to reduce the voltage of signal 22 prior to when it is compared to reference signal 32 or 36, in order to increase the accuracy of feedback signal 42.

Figure 4:
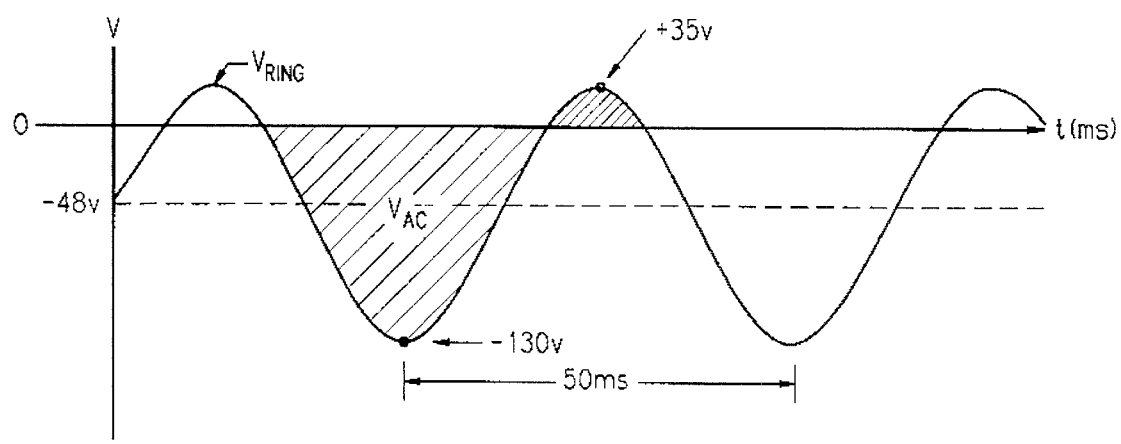
FIG. 4 depicts a standard AC sine wave ringing signal under normal SIU operating voltage conditions.
Figure 5:
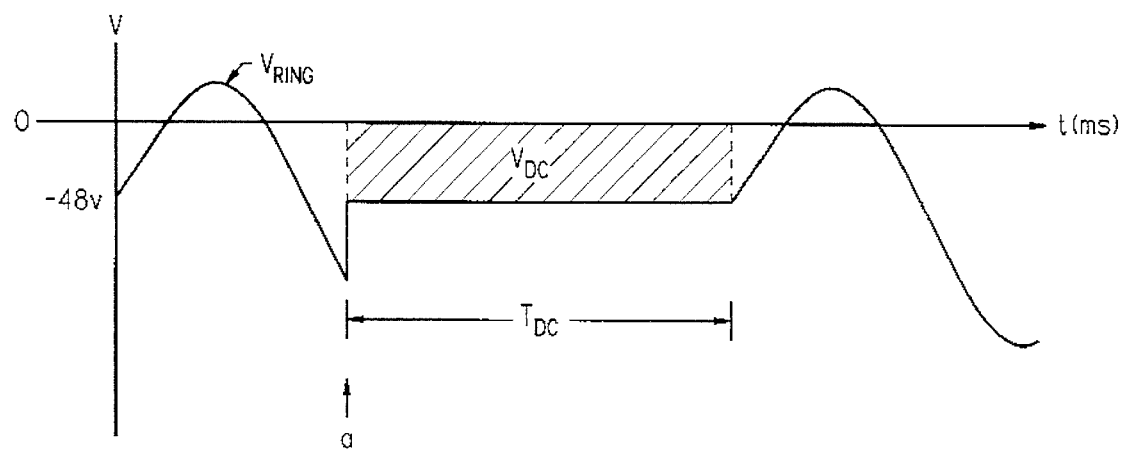
FIG. 5 depicts implementation of a DC offset voltage on a ringing signal during an undervoltage condition.

As illustrated in FIG. 4, during normal SIU voltage conditions, i.e., when $V_{SIU} \geq V_{MIN}$, ringing output voltage $V_{RING}$ is shaped by (AC) reference signal 32 in the form of an AC sine wave. In the embodiment shown, $V_{RING}$ is supplied at 56 volts-RMS by the power converter operation, having a peak nominal voltage of around 82 volts. $V_{RING}$ is centered at a −48 volts offset in order for the SIU to detect an off-hook condition and is transmitted at a frequency of 20 hertz, i.e., with a peak to peak period of 50 ms. As depicted in FIG. 5, during an undervoltage condition, i.e., when $V_{SIU} < V_{MIN}$, illustrated as occurring at t=a, ringing output voltage $V_{RING}$ is shaped by (DC) reference signal 36 in the form of a steady-state, −48 volts DC signal. As demonstrated by comparing shaded areas $V_{AC}$ and $V_{DC}$ of FIGS. 4 and 5, respectively, when implemented as a DC offset signal, $V_{RING}$ consumes considerably less operating voltage during a 50 ms cycle than when implemented as a normal AC ringing signal.

Preferably, voltage detection circuit 26 is provided with delay means (not shown), such as an RC or LC delay circuit, to maintain the (undervoltage) control signal 34 "on" for a predetermined amount of time, $T_{DC}$, when an undervoltage condition is first detected, regardless of whether the SIU operating voltage $V_{SIU}$ returns to a sufficient operating level prior to the duration of $T_{DC}$. $T_{DC}$ is preferably selected to be at least 20 ms to allow for voltage recovery in an SIU and is preferably greater, e.g., 50 ms in the embodiment illustrated in FIG. 5. By implementing a "minimum" recovery time $T_{DC}$, $V_{SIU}$ is allowed to restore to a safe operating level and then be maintained at that level for a sufficient period of time to ensure stable operation. In this manner, rapid, alternating "on/off" selection between AC and DC ringing reference signals by selection circuit 30 is avoided. A maximum holding time, preferably no more than 100 ms, —i.e., no more than two (AC) sine wave cycles at 20 hertz, is also preferred in order to avoid unnecessary disruption of audible ringing signal transmission over the subscriber line. If, at the end of the predetermined time interval, an undervoltage condition in $V_{SIU}$ is still detected by circuit 26, then control signal 34 and corresponding DC reference signal 36 are maintained for an additional time interval $T_{DC}$, with the process repeated until sufficient SIU operating voltage is finally restored, or until ringing signal generation is no longer required in the SIU.

Thus, a ringing voltage power supply system for a remote telecommunications subscriber interface unit has been disclosed, including SIU voltage detection circuitry operating in conjunction with variable-state ringing reference signal generation. While embodiments and applications of the present invention have been illustrated and described, it would be apparent to those skilled in the art that many other modifications are possible without departing from the inventive concepts herein.

The scope of the invention, therefore, is not to be restricted except in the spirit of the appended claims.

We claim:

1. A power supply system for a telecommunications subscriber interface unit, comprising:

reference signal means for converting an operating supply voltage into a ringing voltage signal shaped substantially according to a ringing reference signal; and reference signal selection circuitry, which outputs either a reference AC sine wave as said ringing reference signal or a reference DC voltage as said ringing reference signal, depending on said operating supply voltage.

2. The power supply system of claim 1, further comprising a voltage detection circuit that monitors the voltage level of said operating supply voltage and, when said operating supply voltage drops below a certain level, outputs a signal to said reference signal selection circuitry.

3. The power supply system of claim 1, wherein said reference signal selection circuitry switching its output from said reference AC sine wave to said reference DC voltage as said ringing reference signal when said operating supply voltage drops below a predetermined level.

4. The power supply system of claim 3, wherein said reference signal selection circuitry outputs said reference DC voltage as said ringing reference signal in lieu of said reference AC sine wave for a preselected time interval when said operating supply voltage drops below said predetermined level.

5. The power supply system of claim 4, wherein said preselected time interval is at least 20 ms.

6. The power supply system of claim 4, wherein said preselected time interval is not greater than 100 ms.

7. The power supply system of claim 3, wherein said reference signal selection circuitry outputs said reference DC voltage as said ringing reference signal in lieu of said reference AC sine wave until said operating supply voltage rises to a level at or above said predetermined level.

8. The power supply system of claim 1, wherein said ringing voltage signal comprises a steady-state DC offset voltage sufficient for detection of an off-hook condition on a subscriber line served by the subscriber interface unit when said ringing reference signal is a reference DC voltage.

9. The power supply system of claim 8, wherein said steady-state DC offset voltage is approximately −48 volts.

10. A power supply system for generating on-demand ringing voltage signals in a remotely located subscriber interface unit of a fiber optic telecommunications network, comprising:

means for generating a reference AC sine wave;

means for generating a reference DC voltage;

means for converting an operating supply voltage into an output voltage signal shaped substantially according to an input reference signal, said output voltage signal comprising an AC ringing voltage signal when said input reference signal is said reference AC sine wave and a steady-state DC offset voltage when said input reference signal is said reference DC voltage; and reference signal selection circuitry, said circuitry including means for providing said reference AC sine wave as said input reference signal and means for switching from said reference AC sine wave to said reference DC voltage as said input reference signal when said operating supply voltage drops below a predetermined level.

11. The power supply system of claim 10, further comprising a voltage detection circuit that monitors the voltage level of said operating supply voltage.

12. The power supply system of claim 11, wherein said voltage detection circuit comprises means for causing said reference signal selection circuitry to switch said reference AC sine wave to said reference DC voltage and maintain said reference DC voltage as said input reference signal in lieu of said reference AC sine wave for a preselected time interval when said operating supply voltage drops below said predetermined level.

13. The power supply system of claim 12, wherein said preselected time interval is at least 20 ms and not greater than 100 ms.

14. The power supply system of claim 10, wherein said reference signal selection circuitry maintains said reference DC voltage as said input reference signal in lieu of said reference AC sine wave until said operating supply voltage rises to a level at or above said predetermined level.

15. The power supply system of claim 10, wherein said steady-state DC offset voltage is sufficient to detect an off-hook condition on a subscriber line served by the subscriber interface unit.

16. The power supply system of claim 15, wherein said steady-state DC offset voltage is approximately −48 volts.

17. A method for maintaining minimum operating power in a telecommunications subscriber interface unit ("SIU"), the SIU including means for converting an operating supply voltage into a ringing voltage signal shaped according to a reference AC sine wave, comprising the steps of:

monitoring the operating supply voltage; and switching the reference AC sine wave to a reference DC voltage for a preselected time interval when the operating supply voltage drops below a predetermined level.

18. The method of claim 17, comprising the further step of maintaining said reference DC voltage in lieu of the reference AC sine wave for a preselected time interval.

19. The method of claim 17, comprising the further step of maintaining said reference DC voltage in lieu of the reference AC sine wave until the operating supply voltage rises to a level at or above said predetermined level.

\* \* \* \* \*